(12) United States Patent
Mourou

(10) Patent No.: US 7,604,287 B2
(45) Date of Patent: Oct. 20, 2009

(54) END FORMED ROOF DITCH MOLDING

(75) Inventor: Julien P. Mourou, Warren, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 6 days.

(21) Appl. No.: 11/745,097

(22) Filed: May 7, 2007

(65) Prior Publication Data

US 2008/0277973 A1 Nov. 13, 2008

(51) Int. Cl.
*B62D 25/07* (2006.01)
*B29C 47/02* (2006.01)

(52) U.S. Cl. .................. 296/210; 296/213; 296/93; 428/31

(58) Field of Classification Search .......... 296/210, 296/213, 216.09, 93; 428/31; 29/527.1, 29/527.2, 557, 558; 52/466, 468
See application file for complete search history.

(56) References Cited

U.S. PATENT DOCUMENTS

| | | | | |
|---|---|---|---|---|
| 4,930,279 A | * | 6/1990 | Bart et al. ............... | 52/466 |
| 5,013,083 A | * | 5/1991 | Yada et al. .............. | 296/213 |
| 5,603,546 A | * | 2/1997 | Desir, Sr. ................ | 296/93 |
| 6,030,701 A | | 2/2000 | Johnson et al. | |
| 6,210,615 B1 | * | 4/2001 | Yoshizuru et al. ....... | 264/138 |
| 6,224,145 B1 | * | 5/2001 | Sugiura ................... | 296/210 |
| 6,510,602 B2 | * | 1/2003 | Sugiura ................... | 29/527.2 |
| 6,709,048 B2 | * | 3/2004 | Nagashima et al. ..... | 296/210 |
| 7,004,535 B1 | | 2/2006 | Osterberg et al. | |
| 7,029,060 B1 | | 4/2006 | Osterberg et al. | |
| 7,045,189 B2 | * | 5/2006 | Hui et al. ................ | 428/99 |
| 7,165,807 B2 | * | 1/2007 | Wato et al. .............. | 296/210 |
| 2005/0042418 A1 | * | 2/2005 | Hui et al. ................ | 428/122 |

* cited by examiner

*Primary Examiner*—Glenn Dayoan
*Assistant Examiner*—Gregory Blankenship

(57) ABSTRACT

A roof ditch molding having a Class A finish seamlessly including the end caps thereof. An extruded central molding member includes a beam and a head, wherein the end sections have the beam removed and the head is contoured and provided with a notch. The end sections are then placed into a plastic injection molding machine whereat the head is folded at the notch a shot of plastic deposited adjacent the notch for retention of the fold angle and stiffening of the now formed end caps. A pair of nibs provide engagement with spring clips at the ends of the roof ditch.

11 Claims, 4 Drawing Sheets

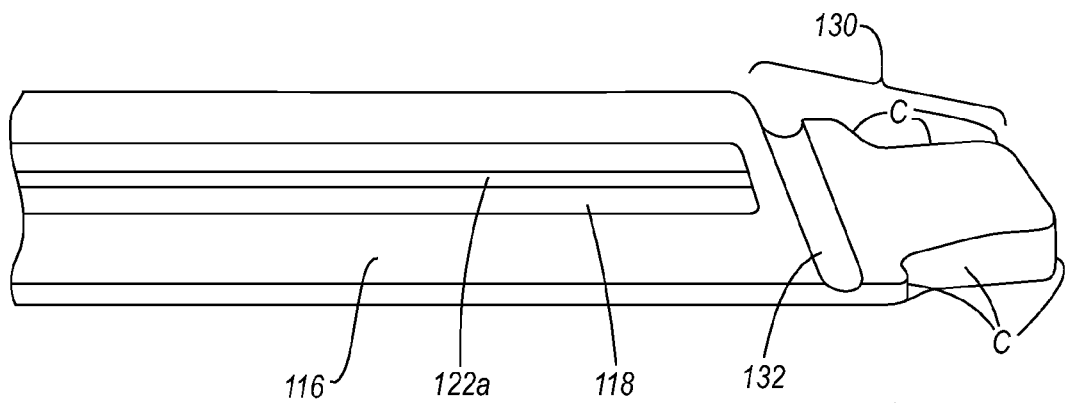
*Fig. 9*
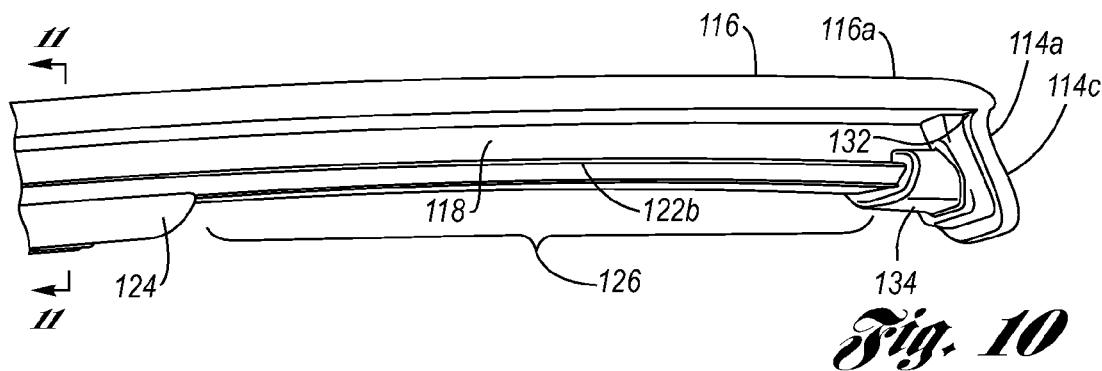
*Fig. 10*
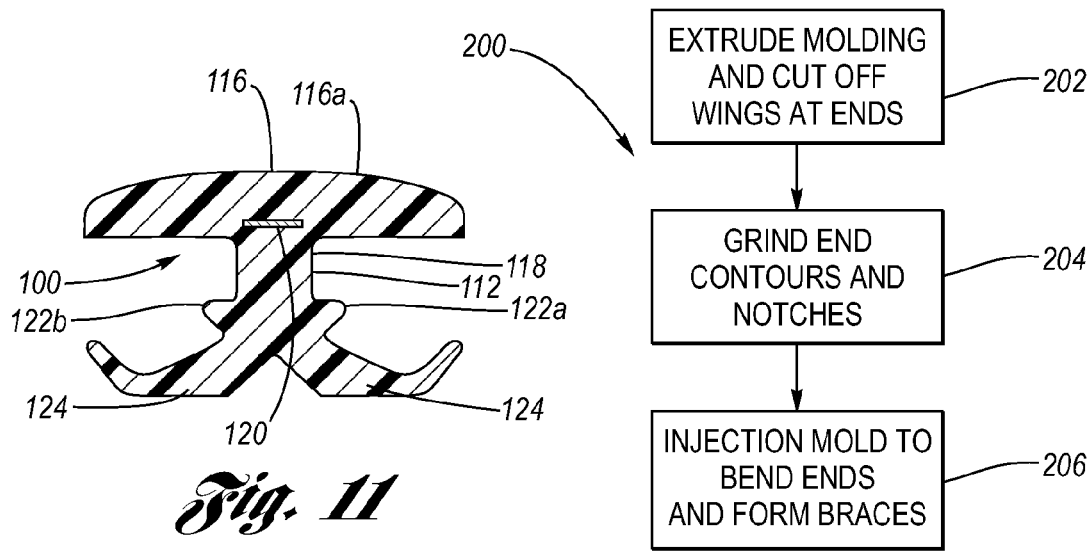
*Fig. 11*
*Fig. 12*

END FORMED ROOF DITCH MOLDING

TECHNICAL FIELD

The present invention relates to roof ditch molding used to cover the roof ditch of motor vehicles, and more particularly to an end formed roof ditch molding in which the Class A finish of the roof ditch molding is continuous, inclusive of the two end caps thereof.

BACKGROUND OF THE INVENTION

In the automotive arts, it is a well known practice to attach the roof panel to each of the left and right body side panels via a respective roof ditch. In this regard, a sealant or sealer tape is used to seal the overlapping metal edges of the roof and respective body side panels, wherein the roof ditch is thereupon covered by a cosmetic roof ditch molding. See, for example, U.S. Pat. Nos. 7,004,535 and 6,030,701.

A roof ditch and associated roof ditch molding of interest is utilized by General Motors Corporation of Detroit, Mich. with respect to its 2006 Chevrolet Impala, of which various aspects are exemplified at FIGS. 1 through 5.

As shown at FIG. 1, a roof ditch 10 runs longitudinally along each of the left and right joinders of the roof panel 12 with the left and right body side panels 14, 16. As best seen at FIGS. 2 and 3, the roof ditch 10 is configured as a slot, having at its floor the overlap of a roof edge 12a with a respective body panel edge (left body side panel edge 14a being shown by way of example in FIGS. 2 and 3). A sealer tape 18 is located at the floor to seal the overlap of the edges. A roof ditch molding 20 is placed into each roof ditch above the sealer tape 18 to provide a cosmetic match between the roof panel and the left and right body side panels.

The roof ditch moldings 20 are each composed of a plastic extruded central molding member 20a and a pair of separately plastic injection molded end caps 20b, 20c (see FIG. 1, as well as FIG. 4, whereat only end cap 20b is shown). The central molding member 20a has a T-shaped cross-section defined by a head 22 and a beam 24, having preferably a metal insert 25 for stiffening. The visible portion of the head 22a has a Class A finish which cosmetically matches the finish of the roof panel 12 and right and left body side panels 15, 16. At the lower extremity of the beam 24 is a pair of wings 26 which are periodically present along the length of the beam to provide securement by flexed conformance to the roof ditch at locations P1 and P2 (see FIG. 2). In order to prevent end peeling of the roof ditch molding from the roof ditch, each end portion of the beam is modified to remove the wings and provide thereat a plunger 28 which interferingly couples to a spring bracket 30 which is, itself, anchored in the roof ditch at the sealer tape 18 (see FIG. 3).

FIG. 5 is a block diagram 50 indicating the steps of manufacture of the prior art roof ditch molding 10.

At execution Block 52, the central molding member 20 is extruded, inclusive of the head 22, the beam 24 and the wings 26, wherein the wings may be composed of a more flexible material than the central molding member.

At execution Block 54, the wings are routered away at the end portions of both ends of the beam (see 24a in FIG. 4) and at selected periodic locations along the beam so that discrete sections of wings are present between the end portions.

At execution Block 56, a surface prep 32 (see FIG. 3) is applied to the beam 24 at the end portions, the end portions are then placed in an injection molding machine, and the plungers 28 are then formed as a plastic injection mold onto the beam.

Finally, at execution Block 58 each end cap 20d is separately injection molded onto the respective ends of the central molding member by placement of a section of each end portion of the central molding member into an injection molding machine (the result is shown best at FIG. 4).

While the roof ditch molding 20 serves its purpose quite well, there is difficulty encountered with respect to providing a seamless look to the Class A finish 22a of the head 22 and the Class A finish 20d of the end caps 20a, 20b, particularly in view of the line of interfacial demarcation 34 as between the extruded central molding member and the injection molded end caps. Further, while the injection molding of the plungers creates heat to the Class B side, this heat can cause untoward deformation of the Class A side of the head.

Accordingly, what remains needed in the art is some way to make a Class A finish seamlessly extending between the central molding member and the end caps of a roof ditch molding.

SUMMARY OF THE INVENTION

The present invention is a roof ditch molding having a Class A finish extending between the central molding member and the end caps thereof, effected by the end caps being integrally formed of the head of the central molding member.

The end formed roof ditch molding according to the present invention includes a plastic extruded central molding member inclusive of a beam, a head and wings at the lowermost extremity of the beam, wherein end portions of the beam have the wings removed and an end section of each end portion has the beam removed, and wherein at each end section the head is contoured to assume an end cap shape and is provided with a notch. Each end portion is then placed into a plastic injection molding machine whereat the end section thereof is folded at the notch and a shot of plastic deposited adjacent the notch as a brace for retention of the fold angle and stiffening of its now fully formed end cap. Only one end section may have the integral, end formed end cap in situations in which the roof ditch molding requires an end cap at only one end thereof.

It is an additional aspect of the present invention that the beam be extruded to include a pair of nibs (one on either side of the beam) disposed between the head and the wings. A metal insert may be provided in the head or beam during the extrusion process. In this regard, the periodic removal of the wings at the end portions of the beam provides for the nibs to interferingly engage the spring brackets of the roof ditch.

In operation of the end formed roof ditch molding according to the present invention, because the end caps are integrally formed of the head of the central molding member, the Class A finish is seamlessly continuous from end cap to end cap, and the cosmetic appearance of the end formed roof ditch molding is flawless.

Accordingly, it is an object of the present invention to provide an end formed roof ditch molding in which the end caps are integrally formed of the head of the central molding member thereof, whereby the Class A finish is continuous from end cap to end cap so that the cosmetic appearance of the end formed roof ditch molding is flawless.

This and additional objects, features and advantages of the present invention will become clearer from the following specification of a preferred embodiment.

BRIEF DESCRIPTION OF THE DRAWINGS

FIG. 9 is a truncated, bottom perspective view of a end formed roof ditch molding according to the present invention, shown at an intermediate state of manufacture.

FIG. 10 is a truncated, side perspective view of a final manufactured end formed roof ditch molding of FIG. 6.

FIG. 11 is a sectional view seen along line 11-11 of FIG. 10.

FIG. 12 is a block diagram of the steps of manufacture of the end formed roof ditch molding of FIG. 6.

DESCRIPTION OF THE PREFERRED EMBODIMENT

Figure 1:
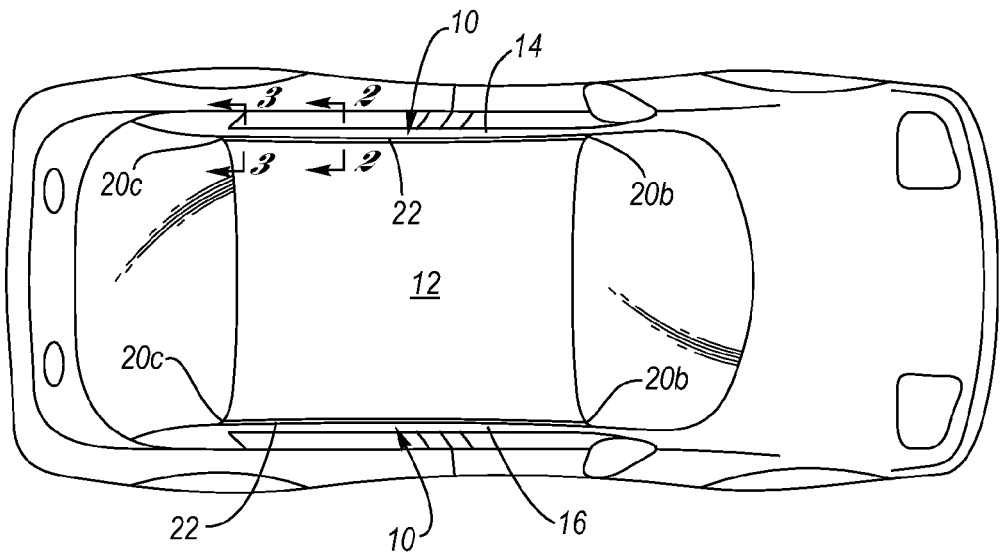
FIG. 1 is a top plan view of a moor vehicle with roof ditches and prior art roof ditch moldings therefor.

Referring now to the Drawing, FIGS. 6 through 11 depict various views of, and FIG. 12 depicts the manufacturing steps for, an end formed roof ditch molding 100 according to the present invention.

Figure 2:
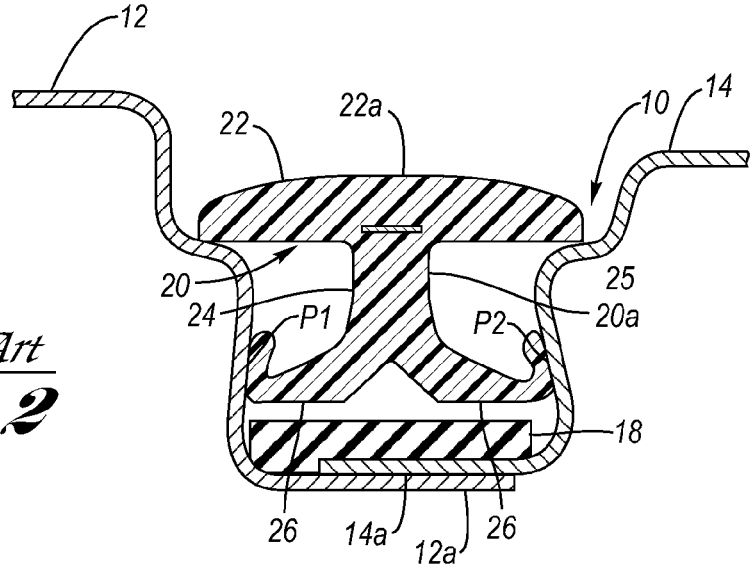
FIG. 2 is a sectional view taken along line 2-2 of FIG. 1.
Figure 3:
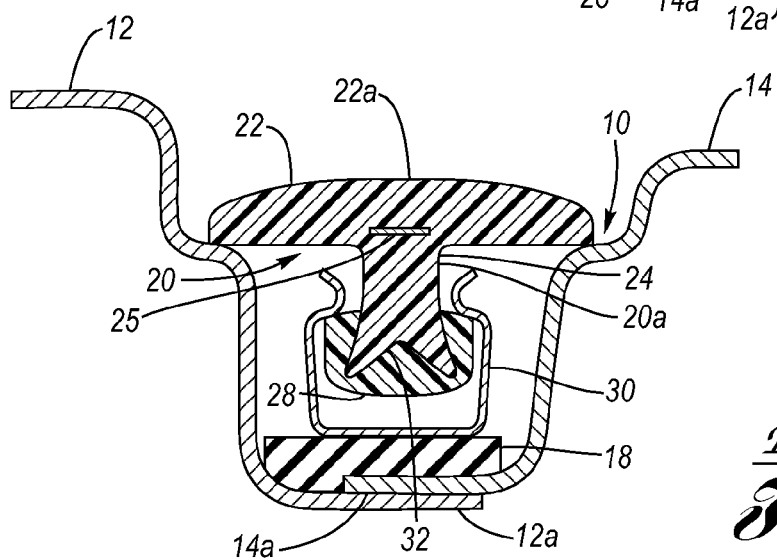
FIG. 3 is a sectional view taken along line 3-3 of FIG. 1.
Figure 4:
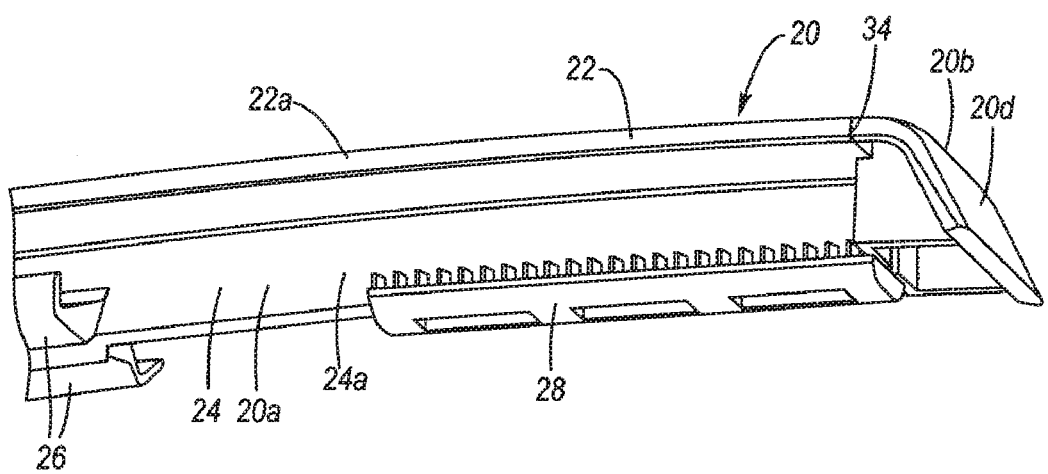
FIG. 4 is a truncated, perspective view of a portion of the prior art roof ditch molding of FIG. 1.
Figure 5:
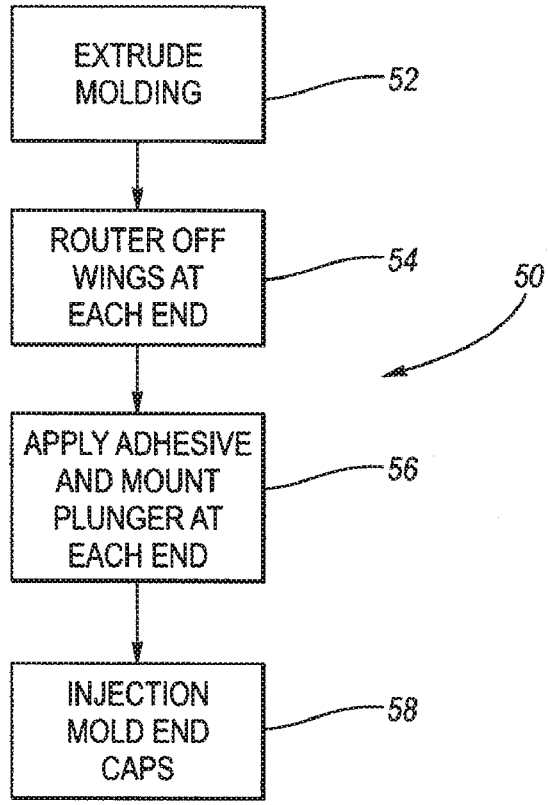
FIG. 5 is a block diagram of the steps of manufacture of the prior art roof ditch molding of FIG. 1.
Figure 6:
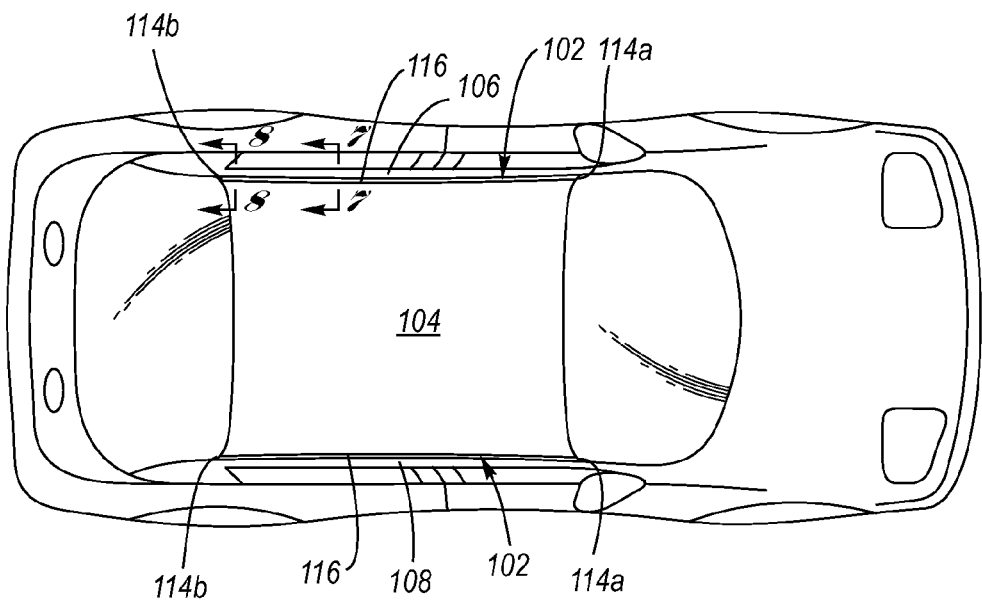
FIG. 6 is a top plan view of a moor vehicle with roof ditches and end formed roof ditch moldings therefor according to the present invention.

Referring firstly to FIG. 6, a roof ditch 102 runs longitudinally along each of the left and right joinders of the roof panel 104 with the left and right body side panels 106, 108. The roof ditch 102 is configured generally in a conventional manner as discussed hereinabove with respect to FIGS. 1 through 3, being in the general form of a slot having its floor defined by the overlap of a respective roof panel edge 104a with a respective body panel edge (left body panel edge 106a being shown in FIGS. 7 and 8 merely be way of example). A sealer tape 110 is conventionally located at the floor of the roof ditch 102 in order to provide a seal of the overlapped roof and side panel edges.

Figure 7:
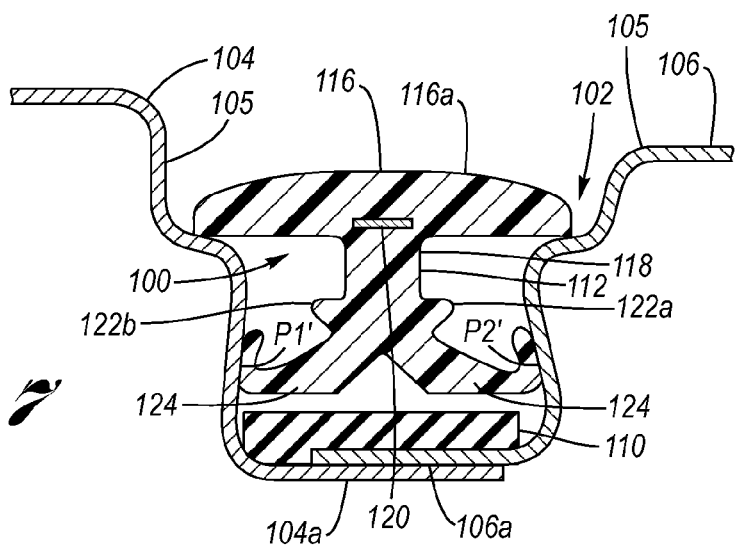
FIG. 7 is a sectional view taken along line 7-7 of FIG. 6.
Figure 8:
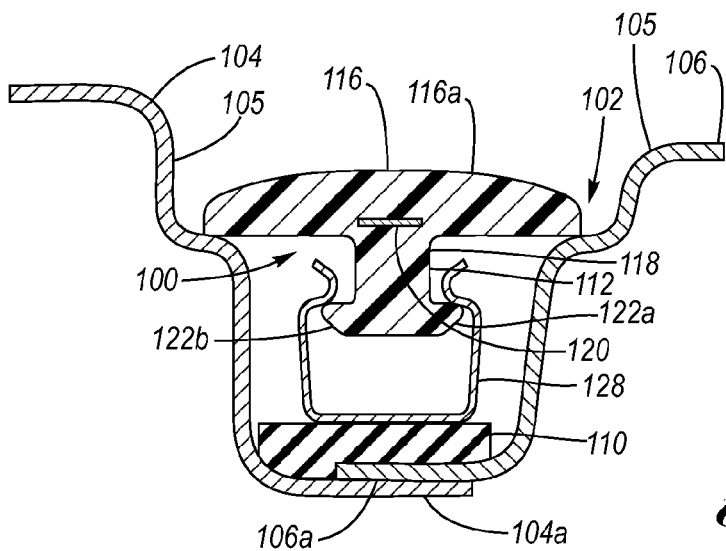
FIG. 8 is a sectional view taken along line 8-8 of FIG. 7.

As shown best at FIGS. 7 and 8, the end formed roof ditch molding 100 according to the present invention is placed into each roof ditch 102 above the sealer tape 110 to provide a flawless cosmetic match between the roof panel and the left and right body side panels. The end formed roof ditch moldings 100 are each composed of a plastic extruded central molding member 112, wherein it will be described hereinbelow how the end caps 114a, 114b are integrally formed thereof (see FIG. 6, as well as FIG. 10 whereat only end cap 114a is shown).

The central molding member 112 has a T-shaped cross-section defined by a head 116 and a beam 118. Preferably a metal insert 120 for stiffening is provided during the extrusion process. A pair of nibs 122a, 122b, one nib disposed on each side of the beam 118, are also provided during the extrusion process. At the lower extremity of the beam 118 is a pair of wings 124 also provided during the extrusion process, which may be formed of a material more flexible that that of the beam and the head. The wings 124 are periodically present along the length of the beam 118 to provide securement to the roof ditch by flexed conformance at locations P1' and P2' (see comparison between unflexed state of the wings at FIG. 11 to the flexed state of the wings in the roof ditch at FIG. 7).

The visible portion of the head has a Class A finish 116a, and end caps 114a, 114b also have a Class A finish 114c, wherein the Class A finish is flawlessly continuous with respect to the head and end caps. This feature is made possible because the end caps are integral with the head. The Class A finish of both the head and the end caps cosmetically matches the Class A finish 105 of both the roof and right and left body side panels.

In order to prevent end peeling of the end formed roof ditch molding 100 from the roof ditch 102, each end section (see 126 at FIG. 10) of the beam 118 is modified to remove the wings 124, whereby the nibs 122a, 122b are then thereat the lowest extremity of the beam. The nibs 122a, 122b interferingly couple to a spring bracket 128 secured in the roof ditch at the sealer tape 110 (see FIG. 8), obviating the above mentioned plunger and all its associated manufacturing steps FIG. 12 is a block diagram 200 indicating the steps of manufacture of the end formed roof ditch molding 100, wherein a mid-stage of the manufacture is shown at FIG. 9, and a finished stage of the manufacture is shown at FIGS. 10 and 11.

At execution Block 202, the central molding member 112 is plastic extruded, inclusive of the head 116, beam 118, nibs 122a, 122b, wings 124 and insert 120 (if present), wherein the wings may be composed of a more flexible material than the central molding member, and wherein as the extrusion proceeds, the wings are sliced off at the end portions of the beam, as for example by a blade positioned appropriately near the extrusion location of the plastic extrusion machine, whereby the removal of the wings results in the nibs becoming locally thereat at the lowest extremity of the beam.

At execution Block 204, at the end section 130 of the head 116 (see FIG. 9), the beam 118 is removed, an end cap contour C is provided, and a fold notch 132 provided, these three operations all being preferably provided by a grinding operation. The end result of execution Block 204 is shown at FIG. 9

Finally, at execution Block 206 a selected part of the end portion 126 of the central molding member is placed into a plastic injection molding machine, wherein the end section 130 is bent at the fold notch 132 to the predetermined angle with respect to the head, and a shot of plastic is injected at the fold notch to provide a brace 134 which affixes the orientation of the completed respective end cap 114a, 114b, (see FIG. 6, and in particular see the end cap 114a shown at FIG. 10).

As can be understood from FIG. 10, since the head and the end caps are an integrally formed single piece, there is no interfacial demarcation therebetween, and that since the head and the end caps have continuously the same Class A finish, the cosmetic appearance of the end formed roof ditch molding 100 is flawless, being far superior to the prior art roof ditch molding which has an interfacial demarcation and differing manufactures of the head and the end caps.

It is to be understood that the inclusion of the pair of nibs with the central molding member provides an "I-beam" cross-section thereof (i.e., of the head, the beam and the pair of nibs) which improves the bending strength of the roof ditch molding according to the present invention as compared to the prior art roof ditch molding having an absence of nibs. This improved bending strength improves the final appearance and is based upon a right balance of the nib dimensions and the wing geometry with respect to the rest of the part, as shown at FIG. 11. Further, since there is no injection molding step to add a plunger, as is required in the prior art, there is an improved surface appearance to the Class A side of the head whereat the Class A finish is located.

It is to be further understood that while it is most preferred to include both the nibs and at least one integral, end formed end cap in the most preferred embodiment of the present invention, other embodiments of the present invention can be derived therefrom, namely: 1) the extrusion process of the head and beam can include the nibs whether or not the end caps are formed integrally with the head, and 2) the end caps can be made integrally with the head whether or not the nibs are part of the extrusion of the head and beam.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A roof ditch molding for a roof ditch of a motor vehicle, comprising:
 a main molding member comprising a head and an integrally formed beam; and
 at least one end cap integrally formed of said head;
 wherein said head has at least one fold notch formed therein, said at least one fold notch being disposed transversely across said head;
 wherein each end cap comprises a transverse bend in said head, wherein the bend is superposed a respective fold notch; and
 wherein a plastic brace secures each end cap, respectively, to said beam adjacent its respective fold notch.

2. The roof ditch molding of claim 1, further comprising a pair of nibs formed on said beam, one nib being respectively disposed at each side of said beam.

3. The roof ditch molding of claim 2, further comprising wings connected with a lower extremity of said beam, wherein said pair of nibs are located on said beam between said head and said wings.

4. The roof ditch molding of claim 3, wherein said wings are present only at discrete, mutually spaced locations along said beam, wherein said wings are absent at a portion of each end of said main molding member; and wherein at the portion of each end whereat said wings are absent, said nibs are located at a substantially lowermost extremity of said beam.

5. The roof ditch molding of claim 1, further comprising wings connected with a lower extremity of said beam, wherein said pair of nibs are located on said beam between said head and said wings.

6. The roof ditch molding of claim 5, wherein said wings are present only at discrete, mutually spaced locations along said beam, wherein said wings are absent at a portion of each end of said central molding member; and wherein at the portion of each end whereat said wings are absent, said nibs are located at a substantially lowermost extremity of said beam.

7. A method for making a roof ditch molding, comprising the steps of:
 extruding a central molding member comprising a head and an integral beam;
 removing the beam from at least one end of said central molding member;
 forming a fold notch in the head at the at least one end;
 bending said head superposed a respective fold notch in the head at the at least one end to provide an end cap thereat, wherein the end cap formed at the at least one end is integrally formed of said head; and
 injection molding a plastic brace onto said central molding member adjacent said fold notch, wherein said brace retains said end cap at a predetermined angle with respect to said head.

8. The method of claim 7, further comprising shaping a predetermined end cap contour at the at least one end prior to said step of bending.

9. The method of claim 8, wherein said step of extruding further comprises extruding wings at a lowermost location of said beam, and extruding a pair of nibs on said beam, said pair of nibs being located between said wings and said head.

10. The method of claim 9, further comprising removing said wings from selected discrete locations of said beam including the end portions, whereat said pair of nibs is located at substantially a lowermost location of said beam.

11. A roof ditch molding and roof ditch of a motor vehicle, comprising:
 a roof ditch comprising:
  overlapped panel edges mutually forming a slot; and
  a spring clip located adjacent each end of said slot; and
 an end formed roof ditch molding fitted into said roof ditch, said end formed roof ditch molding comprising:
  a main molding member comprising a head and an integrally formed beam;
  at least one end cap integrally formed of said head;
  a pair of nibs formed on said beam, one nib being respectively disposed at each side of said beam; and
  wings connected with a lower extremity of said beam, wherein said pair of nibs are located on said beam between said head and said wings;
  wherein said wings are present only at discrete, mutually spaced locations along said beam, wherein said wings are absent at a portion of each end of said main molding member; and wherein at the portion of each end whereat said wings are absent, said nibs are located at the substantially lowermost extremity of said beam;
 wherein said pair of nibs are interferingly engaged with the spring clips so as to thereby retain said end formed roof ditch molding in said roof ditch;
 wherein said head has at least one fold notch formed therein, said at least one fold notch being disposed transversely across said head;
 wherein each end cap comprises a transverse bend in said head, wherein the bend is superposed a respective fold notch; and
 wherein a plastic brace secures each end cap, respectively, to said beam adjacent its respective fold notch.

* * * * *